United States Patent Office 3,002,807
Patented Oct. 3, 1961

3,002,807
POLYMERIC COMPOUNDS
Margot Becke, Heidelberg, Germany, assignor to Joh. A. Benckiser G.m.b.H. Chemische Fabrik, Ludwigshafen (Rhine), Germany
No Drawing. Filed June 2, 1958, Ser. No. 738,942
Claims priority, application Germany June 1, 1957
14 Claims. (Cl. 23—14)

The present invention relates to new polymeric compounds and more particularly to polymers containing nitrogen and phosphorous as the basis thereof.

It is a primary object of the present invention to provide new polymers containing nitrogen and phosphorous and having properties rendering these polymers suitable for use as protective coverings to protect against fire and as a component of other polymers to render such other polymers resistant against fire.

It is still another object of the present invention to provide for the production of tetra-phosphoryl-deca-amine derivatives and it is yet another object of this invention to provide for the polymerization of such derivatives.

As a further object, the present invention contemplates the production of new polymers which have plastic characteristics and which can be casted in a mold to produce objects of any desired shape. However, the physical properties and the chemical properties of these polymers render the same useful for other purposes such as for flame-proofing or the like.

It is a further object of the present invention to provide for the production of polymers whose physical properties particularly as to solubility can be controlled as desired. Thus, it is possible in accordance with the present invention to produce nitrogen and phosphorous-containing polymers which are insoluble in water and in organic solvents, or products which are insoluble in water but soluble in organic solvents.

Other objects and advantages of the present invention will be apparent from a further reading of the specification and of the appended claims.

With the above objects in view, the present invention mainly comprises polymers of monomeric compounds having the following general formula:

$$P_4O_4(NHR)_8$$

wherein R may be H, $C_6H_5$, $CH_3$, $CH_2$—$CH_3$ or a radical $(CH_2)_{2-15}.CH_3$.

The polymers of the present invention have interesting physical and chemical properties which render these polymers useful for many purposes. The polymers of the present invention may be casted in a mold. Furthermore, the polymers of the present invention may be made insoluble in water and in organic solvents or insoluble in water and soluble in organic solvents. The polymers can also be made so as to have a paste-like consistency rendering the polymers suitable as a constituent of ointments.

Mainly, the polymers of the present invention are stable against acids and alkaline solutions as well as against the action of heat. Accordingly, the polymers can be made into the form of protective coverings to protect objects against the action of acids, alkalies, and fire. In addition, the polymers of the present invention can be used as additive for lacquers as well as copolymerisates with polyamides and polyurethanes, in order to render the same flame-proof.

It is a further object of the present invention to provide a method of producing the new polymers of the present invention.

The process of preparing the nitrogen-phosphorous-containing polymers of the present invention mainly comprises the steps of reacting tetra-phosphoryl-deca-chloride with ammonia or an amine according to the following general equation:

$$P_4O_4Cl_{10} + 20RNH_2 \rightarrow P_4O_4(RNH)_{10} + 10RNH_3Cl$$

wherein R has the same definition as above, and then polymerizing the thus formed tetra-phosphoryl-deca-amine derivative.

The formed tetra-phosphoryl-deca-amine derivatives are colorless and are in most cases water soluble. It is therefore quite difficult to separate the same from the by-products of the reaction, such as ammonium chlorides, which are also water soluble. However, it has been found in accordance with the present invention that the above reaction mixture produced by the reaction of the tetra-phosphoryl-deca-chloride with ammonia or an amine can be converted into a polymeric product which is free of chlorine and which is insoluble in water by heating the reaction mixture under vacuum to a temperature between about 120 and 200° C. The polymer which is thus formed has the properties and can be used for the purposes mentioned above.

It is preferred to utilize a high degree of vacuum during the heating of the reaction mixture. Preferably the degree of vacuum utilized should be between $10^{-2}$ and $10^{-3}$ Torr.

Besides ammonia, the following amines may be used according to the present invention: methyl-amine, ethyl-amine or any other amine of the general formula $$H_2N—(CH_2)_x—CH_3$$

in which $x$ is an integer between 2 and 15. The reaction is not only possible with aliphatic amines but also with aromatic amines, such as aniline.

The degree of polymerization of the polymers of the present invention will vary somewhat depending upon the monomer being polymerized and other conditions of the polymerization. In general, the degree of polymerization is preferably between about 8 and 12 monomer units and most preferably about 10 monomer units. Thus, the recurring monomer units, preferably between about 8 and 12 thereof combine to form the polymers of the present invention of which the general formula is as follows:

$$[P_4O_4(NHR)_8]_n$$

wherein R has the same definition as above and wherein $n$ is between about 8 and 12 and preferably about 10.

The following are among the polymers that have been produced of different monomeric units according to the present invention:

$$[P_4O_4(NH_2)_8]_n$$
$$[P_4O_4(NHC_6H_5)_8]_n$$
$$[P_4O_4(NH.CH_2.CH_2.CH_2.CH_3)_8]_n$$
$$[P_4O_4(NH.(CH_2)_{15}.CH_3)_8]_n$$
$$[P_4O_4(NH.(CH_2)CH_3)_8]_n$$
$$[P_4O_4(NH.CH_3)_8]_n$$

The following examples are given to further illustrate the present invention. The scope of the invention is not, however, meant to be limited to the specific details of the invention. All temperatures are centigrade.

EXAMPLE 1

*Polymeric product made from tetra-phosphoryl-decamide*

300 ml. of dry ammonia are liquefied in a 1 liter three-necked flask provided with a stirrer and a soda lime tube. Then, a solution of 5 g. $P_4O_4Cl_{10}$ in 100 ml. chloroform is added dropwise within 30 minutes. Thereupon, the surplus ammonia is allowed to evaporate and the chloroform is drawn off under vacuum. The residue consisting of $P_4O_4(NH_2)_{10}$ and ammonium chloride is heated in a vacuum of $10^{-2}$ to $10^{-3}$ Torr. to 150–200°. The composition of the thus resulting product corresponds to the formula $$[P_4O_4(NH_2)_8]_n$$

P, calc. 39.25%; N, calc. 35.15%
P, found 39.30%; N, found 35.20%

This polymeric product is insoluble in water and all common organic solvents. Therefore, it can be isolated from the by-product ammonium-chloride by washing with water. It is very stable against heat. Decomposition occurs only when being heated to a dull-red heat. Mineral acids and bases attack this product slowly only in the heat. It is even stable against oxygen at a temperature of 150°.

EXAMPLE 2

*Polymeric product made from tetra-phosphoryl-decanilide*

300 ml. of fresh distilled aniline are introduced into a 1 liter three-necked flask provided with a stirrer and a soda lime tube. Then, a solution of 5 g. $P_4O_4Cl_{10}$ in 100 ml. chloroform is added dropwise within 30 minutes. The temperature is kept below 25°, otherwise colored products are obtained. After another 45 minutes the chloroform is distilled-off under vacuum. The thus resulting reaction mixture is heated for 3 hours in a vacuum of $10^{-3}$ Torr. to a temperature between 150 and 200°. The residue is allowed to cool down. It is a hard mass, having a composition which corresponds to the formula $$[P_4O_4(NHC_6H_5)_8]_n$$

and melts without decomposition at 120°. It is soluble in alcohol, dioxan, nitro-benzene and tetra-hydrofurane; insoluble in water; bases and acids attack the product only in the heat.

P, calc. 13.41%; N, calc. 12.12%
P, found 13.40%; N, found 12.10%

EXAMPLE 3

*Polymeric product made from tetra-phosphoryl-deca-butyl-amide*

The procedure as set forth in Example 2 is repeated with the exception that 100 ml. butylamine are used instead of 300 ml. aniline. After the chloroform has been distilled off the reaction mixture is heated under vacuo ($10^{-3}$ Torr.) at 150 to 200° for a period of 2–3 hours. The end of the polymerization process is recognized when the reaction mass releases no more gases. An opaque, slightly yellow, hard mass of a composition corresponding to the formula $$[P_4O_4(NHC_4H_9)_8]_n$$

is thus obtained. It is insoluble in water, soluble in methanol; softens at about 150°.

P, calc. 13.25%; N, calc. 14.66%
P, found 13.30%; N, found 14.70%

EXAMPLE 4

*Polymeric product made from tetra-phosphoryl-deca-cetylamide*

35 g. cetylamide dissolved in 150 ml. chloroform are reacted with tetra-phosphorylchloride in the same way as described in the foregoing Examples 2 and 3. The yield is a yellow waxy substance of the composition $$[P_4O_4(NHC_{16}H_{33})_8]_n$$

It is soluble in benzene, xylene, carbon tetrachloride, chloroform, nitrobenzene and tetrahydrofurane; insoluble in water; resistant against acids and bases; melting point at about 150° (not sharp); molecular weight in benzene: 23,000.

P, calc. 5.88%; N, calc. 5.31%
P, found 5.90%; N, found 5.30%

EXAMPLE 5

*Polymeric product made from tetra-phosphoryl-deca-dodecylamide*

30 g. dodecylamine dissolved in 150 ml. chloroform are reacted with tetraphosphorylchloride in the same way as described in the foregoing Examples 2 to 4. Cooling of the reaction mixture may be omitted in this case. A yellow-brownish waxy-like product is obtained which corresponds to the formula $$[P_4O_4(NHC_{12}H_{25})_8]_n$$

It is soluble in benzene, xylene, chloroform, carbon tetrachloride, acetic acid ester and tetrahydrofurane, insoluble in water, rather resistant against acids and bases, melting point at about 150° C. (not sharp), cyroskopic molecular weight determination in benzene: 20000.

P, calc. 7.46%; N, calc. 6.75%
P, found 7.50%; N, found 6.80%

EXAMPLE 6

*Polymeric product made from tetra-phosphoryl-deca-methyl-amide*

The procedure as set forth in Example 1 is repeated with the exception that 100 ml. dry methylamine are used instead of ammonia. After the reaction has ceased, a clear solution is obtained which is allowed to stand at room temperature for 12 hours. Then, the chloroform is drawn off under vacuo. The crystalline residue is polymerized by heating for about 3 hours at 150–200° in vacuo ($10^{-3}$ Torr.). A grayish dry mass is thus obtained corresponding to the formula $$[P_4O_4(NHCH_3)_8]_n$$

P, calc. 28.97; N, calc. 26.17%
P, found 29.0%; N, found 26.20%

Although the preferred ratio of $P_4O_4Cl_{10}$:ammonia (or amine) equals 1:20 as stated by the equation in column 2, line 3, other ratios such as 1:10 or 1:30 are also applicable.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A water insoluble polymer consisting of a plurality of the following recurring monomer units:

$$P_4O_4(NHR)_8$$

wherein R is selected from the group consisting of H, $C_6H_5$, $CH_3$, $CH_2$—$CH_3$ and $(CH_2)_{2-15}$·$CH_3$.

2. A water insoluble polymer consisting of between about 8 and 12 monomeric units of the following general formula:

$$P_4O_4(NHR)_8$$

wherein R is selected from the group consisting of H, $C_6H_5$, $CH_3$, $CH_2$—$CH_3$ and $(CH_2)_{2-15}$·$CH_3$.

3. A water insoluble polymer consisting of about 10 monomeric units of the following general formula:

$$P_4O_4(NHR)_8$$

wherein R is selected from the group consisting of H, $C_6H_5$, $CH_3$, $CH_2$—$CH_3$ and $(CH_2)_{2-15}$·$CH_3$.

4. A water insoluble polymer consisting of between about 8 and 12 monomeric units of the following general formula:

$$P_4O_4(NH_2)_8$$

5. A water insoluble polymer consisting of between about 8 and 12 monomeric units of the following general formula:

$$P_4O_4(NHC_6H_5)_8$$

6. A water insoluble polymer consisting of between about 8 and 12 monomeric units of the following general formula:

$$P_4O_4(NH.CH_2.CH_2.CH_2.CH_3)_8$$

7. A water insoluble polymer consisting of between about 8 and 12 monomeric units of the following general formula:

$$P_4O_4(NH.(CH_2)_{15}.CH_3)_8$$

8. A water insoluble polymer consisting of between about 8 and 12 monomeric units of the following general formula:

$$P_4O_4(NH.(CH_2).CH_3)_8$$

9. A water insoluble polymer consisting of between about 8 and 12 monomeric units of the following general formula:

$$P_4O_4(NH.CH_3)_8$$

10. A method of producing a water insoluble polymer, comprising the steps of reacting an amine having the general formula:

$$RNH_2$$

wherein R is selected from the group consisting of H, $C_6H_5$, $CH_3$, $CH_2$—$CH_3$ and $(CH_2)_{2-15}.CH_3$ with tetra-phosphoryl-deca-chloride so as to form the corresponding tetra-phosphoryl-deca-amine derivative; and heating the thus formed tetra-phosphoryl-deca-amine derivative at a temperature of about 120–200° C. under vacuum so as to polymerize the same.

11. A method of producing a water insoluble polymer, comprising the steps of reacting an amine having the general formula:

$$RNH_2$$

wherein R is selected from the group consisting of H, $C_6H_5$, $CH_3$, $CH_2$—$CH_3$ and $(CH_2)_{2-15}.CH_3$ with tetra-phosphoryl-deca-chloride in a ratio of about 10–30 mols of said amine per each mol of said tetra-phosphoryl-deca-chloride so as to form the corresponding tetra-phosphoryl-deca-amine derivative; and heating the thus formed tetra-phosphoryl-deca-amine derivative under vacuum at a temperature of about 120–200° C. so as to polymerize the same.

12. A method of producing a water insoluble polymer, comprising the steps of reacting an amine having the general formula:

$$RNH_2$$

wherein R is selected from the group consisting of H, $C_6H_5$, $CH_3$, $CH_2$—$CH_3$ and $(CH_2)_{2-15}.CH_3$ with tetra-phosphoryl-deca-chloride in a ratio of about 10–30 mols of said amine per each mol of said tetra-phosphoryl-deca-chloride so as to form the corresponding tetra-phosphoryl-deca-amine derivative; and heating the thus formed tetra-phosphoryl-deca-amine derivative under a vacuum of about $10^{-2}$ to $10^{-3}$ Torr. at a temperature of about 120–200° C. so as to polymerize the same.

13. A method of producing a water insoluble polymer, comprising the steps of reacting an amine in liquid condition and having the general formula:

$$RNH_2$$

wherein R is selected from the group consisting of H, $C_6H_5$, $CH_3$, $CH_2$—$CH_3$ and $(CH_2)_{2-15}.CH_3$ with tetra-phosphoryl-deca-chloride dissolved in chloroform in a ratio of about 10–30 mols of said amine per each mol of said tetra-phosphoryl-deca-chloride so as to form the corresponding tetra-phosphoryl-deca-amine derivative; and heating the thus formed tetra-phosphoryl-deca-amine derivative under a vacuum of about $10^{-2}$ to $10^{-3}$ Torr. at a temperature of about 120–200° C. so as to polymerize the same.

14. A water insoluble polymer produced by the process of claim 10.

References Cited in the file of this patent

Klement et al.; Z. Anorg. u. Allchem. Chem., Band 282, pp. 149–161 (1955).